(12) United States Patent
Aigner et al.

(10) Patent No.: US 7,917,267 B2
(45) Date of Patent: Mar. 29, 2011

(54) METHOD TO DETERMINE AN OPTIMIZED SHIFT POINT, IN PARTICULAR UPSHIFT POINT, FOR A MANUAL TRANSMISSION

(75) Inventors: Stefan Aigner, Bad Abbach (DE); Laurent Bailliard, Regensburg (DE); Gerhard Schopp, Pettendorf (DE)

(73) Assignee: Continental Automotive GmbH, Hannover (DE)

( * ) Notice: Subject to any disclaimer, the term of this patent is extended or adjusted under 35 U.S.C. 154(b) by 298 days.

(21) Appl. No.: 12/210,315

(22) Filed: Sep. 15, 2008

(65) Prior Publication Data

US 2009/0076692 A1    Mar. 19, 2009

(30) Foreign Application Priority Data

Sep. 18, 2007    (DE) .................. 10 2007 044 401

(51) Int. Cl.
*G06F 7/00* (2006.01)
*G06F 17/00* (2006.01)

(52) U.S. Cl. .......... 701/55; 70/60; 70/61; 70/64; 477/70

(58) Field of Classification Search ................ 701/1, 29, 701/51, 53, 54, 57–61, 64, 123; 477/110, 477/120, 77, 84, 109, 107, 62, 908, 79, 80, 477/83, 86; 73/118.01, 118.02, 115.03; 340/439, 340/441, 456; 434/71
See application file for complete search history.

(56) References Cited

U.S. PATENT DOCUMENTS

| | | | | |
|---|---|---|---|---|
| 4,411,174 A | | 10/1983 | Yokoi et al. | 74/866 |
| 4,539,868 A | | 9/1985 | Habu | 74/864 |
| 4,555,691 A | * | 11/1985 | Hosaka et al. | 340/439 |
| 5,477,452 A | | 12/1995 | Milunas et al. | 364/424.1 |
| 5,730,682 A | * | 3/1998 | Depping et al. | 477/120 |
| 6,066,070 A | * | 5/2000 | Ito et al. | 477/43 |
| 7,228,926 B2 | * | 6/2007 | Takami et al. | 180/65.265 |
| 2002/0132699 A1 | * | 9/2002 | Bellinger | 477/107 |

FOREIGN PATENT DOCUMENTS

| | | |
|---|---|---|
| DE | 31 28 080 A1 | 2/1983 |
| DE | 33 34 722 A1 | 4/1985 |
| DE | 29 23 986 C2 | 12/1987 |
| DE | 196 25 936 A1 | 6/1996 |
| DE | 197 03 561 A1 | 8/1998 |
| DE | 694 17 813 T2 | 8/1999 |

OTHER PUBLICATIONS

English translation of DE 196 25 936 A.*
German Office Action, German application No. 10 2007 044 401.1-14, 3 pages.

\* cited by examiner

*Primary Examiner* — Jack Keith
*Assistant Examiner* — Rami Khatib
(74) *Attorney, Agent, or Firm* — King & Spalding L.L.P.

(57) ABSTRACT

In order to determine an optimized upshift point, it is proposed that a control circuit, on the basis of a current engine operating point ($TQ_{CUR}$;N) calculates a new engine operating point ($TQ_{NEW}$; $N_{NEW}$) produced when shifting up at approximately the same vehicle speed, wherein the current engine operating point is determined as the optimized upshift point if the calculated new engine operating point is below a preset upper torque limit (TQ_MAX_LIM) and is at the same time above a preset lower engine speed limit (N_MIN_x+1) for the higher gear.

16 Claims, 1 Drawing Sheet

METHOD TO DETERMINE AN OPTIMIZED SHIFT POINT, IN PARTICULAR UPSHIFT POINT, FOR A MANUAL TRANSMISSION

CROSS-REFERENCE TO RELATED APPLICATIONS

This application claims priority to German application number 10 2007 044 401.1 filed Sep. 18, 2007, the contents of which is hereby incorporated by reference in its entirety.

TECHNICAL FIELD

The present invention relates to a method to determine, in particular with respect to fuel consumption, an optimized shift point for a combustion engined vehicle with manual transmission.

BACKGROUND

In a vehicle fitted with a manual transmission, minimization of fuel consumption with respect to vehicle emissions by means of an appropriate combustion engine operating point, requires that the driver shifts gear at the right time.

Methods to determine and display an optimized shift point on the instrument panel are already known. It is known from U.S. Pat. No. 4,555,691 how to define or determine the shift point through reaching an engine speed threshold and a vehicle speed. Patent specification U.S. Pat. No. 4,539,868 describes a method wherein the current engine operating point, characterized by the load and engine speed, is first calculated. This operating point is set in the engine consumption map, whence a comparison is made with the optimum consumption. If better consumption is possible, a lamp on the instrument panel is switched on. A similar method is known from DE 31 28 080 A1, wherein the control system, after comparing the operating data with a stored consumption map, passes a signal to a gear shift indicator if the stored limit values are selected so that, when the limit values at the driven wheels are exceeded, at least equally high tractive power is available in the next higher gear with a larger throttle opening.

The disadvantage of the known methods is mainly the relatively high expenditure on calibration, which is needed to store a consumption map in the control system.

SUMMARY

An improved method of the type mentioned in the introduction can be provided, which is capable in particular of minimizing fuel consumption without having a consumption map stored in the engine control device.

According to an embodiment, a method for determining an optimized upshift point for a combustion engined vehicle with manual transmission, may comprise the step of calculating a new engine operating point by a control circuit on the basis of a current engine operating point produced by a clutch torque and an engine speed and using preset gear ratios in the transmission, wherein the new engine operating point is produced when shifting up to the next higher gear at approximately the same vehicle speed, wherein the current engine operating point is determined by the control circuit as the optimized upshift point if the calculated new engine operating point is below a preset upper torque limit and is at the same time above a preset lower engine speed limit for the higher gear.

According to another embodiment, a method for determining an optimized downshift point for a combustion engined vehicle with manual transmission, may comprise the step of calculating a new engine operating point by a control circuit on the basis of a current engine operating point produced by a clutch torque and an engine speed and using preset gear ratios in the transmission, wherein the new engine operating point is produced when shifting down to the next lower gear at approximately the same vehicle speed, wherein the current engine operating point is determined by the control circuit as the optimized downshift point if the calculated new engine operating point is above a preset lower torque limit and is at the same time below a preset upper engine speed limit.

According to a further embodiment, the preset upper and lower torque limits in the engine characteristic graph each may run at a presettable, essentially constant distance below or above a line representing the maximum or minimum available clutch torque. According to a further embodiment, the control circuit may regularly, in particular at a cadence of about 100 ms, calculate whether the respective current engine operating point is valid as the optimized shift point to be determined. According to a further embodiment, the control circuit may issue a shift recommendation in the form of an optical signal by means of a display connected to one of its outputs, if the current engine operating point is determined by the control circuit as an optimized shift point. According to a further embodiment, the control circuit may only issue a shift recommendation if at least one additional activation condition is met, containing a limit value relating to the driving style and/or the current engine operation. According to a further embodiment, the switching on and/or switching off of the shift recommendation may be linked to an additional condition, containing a time criterion. According to a further embodiment, a shift recommendation issued may remain switched on for the duration of a minimum and maximum, both presettable, period of time, even if the shift recommendation were to be forestalled owing to the next engine operating point. According to a further embodiment, after each new engine start, the first shift recommendation may only be allowed to be switched on after an adjustable delay period.

BRIEF DESCRIPTION OF THE DRAWINGS

Embodiments are further explained with reference to the accompanying drawings, in which.

DETAILED DESCRIPTION

Figure 1:
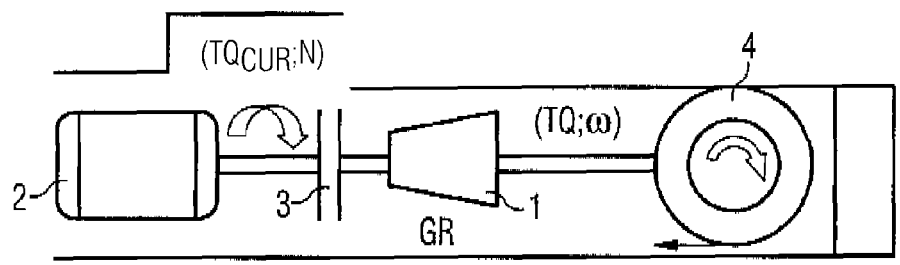
FIG. 1 shows a schematic representation of a vehicle drive train containing a manual transmission which is known from the prior art.

According to an embodiment, in a method to determine an optimized upshift point for a combustion engined vehicle with manual transmission, a control circuit, on the basis of a current engine operating point produced by the clutch torque and the engine speed and using the preset gear ratios in the transmission, calculates a new engine operating point when shifting up to the next higher gear at approximately the same vehicle speed, wherein the current engine operating point is determined by the control circuit as the optimized upshift point if the calculated new engine operating point is below a preset upper torque limit and is at the same time above a preset lower engine speed limit for the higher gear.

According to an embodiment, the calculated new engine operating point is compared with an upper torque limit and a lower engine speed limit. Through this evaluation of the target operating point currently achievable by upshifting, it can for example easily be ensured that there is a sufficient distance from the maximum available clutch torque and from the minimum drivable engine speed for the (as a result of shifting) anticipated new engine operating point. The upshift point may thus be advantageously determined without any comparison with a consumption map which requires a great deal of effort so that, by shifting, a favorable engine operating range, in particular with respect to fuel consumption and ride comfort, can be targeted and, as soon as achievable, also actually obtained.

According to another embodiment, in a method to determine an optimized downshift point, wherein, using the preset gear ratios in the transmission, a new engine operating point is calculated when shifting down to the next lower gear at approximately the same vehicle speed, whereby the current engine operating point is determined by the control circuit as an optimized downshift point if the calculated new engine operating point is above a preset lower torque limit and at the same time below a preset upper engine speed limit for the next lower gear. The favorable target operating range is thus achieved when downshifting with analogous, but reverse steps as in the method to determine the upshift point described above.

According to an embodiment, the upper torque limit is preset so that it runs at a preset, essentially constant distance below a line in the engine characteristic graph which represents the maximum available clutch torque, while the lower torque limit is preset analogously so that it runs at an essentially constant distance above a line which represents the minimum available clutch torque.

According to a further embodiment, the control circuit regularly, in particular at a cadence of about 100 ms, calculates whether the current engine operating point is valid as the optimized shift point to be determined.

According to a further embodiment, the control circuit issues a shift recommendation in the form of an optical signal by means of a display connected to one of its outputs, if the current engine operating point is determined by the control system as an optimized shift point. The strategy to determine an optimized shift point then also may have the advantage that the shift recommendation appears as soon as the drivability of the vehicle in the next higher/lower gear is ensured by checking the available clutch torque and engine speed after shifting.

According to yet a further embodiment, the control circuit only issues a shift recommendation if at least one additional activation condition is met, which contains a limit value relating to the driving style and/or the current engine operation.

It may also be advantageous, if necessary in addition to the above mentioned activation conditions, to link the switching on and/or off of the shift recommendation to an additional condition, which contains a time criterion. It may be of further advantage that a shift recommendation issued once remains switched on for the duration of a minimum and maximum, both presettable, period of time, even if the shift recommendation were to be forestalled owing to the next engine operating point. According to a further embodiment, a time criterion may also be advantageously implemented so that, after each new engine start, the first shift recommendation is only allowed to be switched on after an adjustable delay period.

In order to explain the method, FIG. 1 first represents a vehicle drive train known per se. The drive train includes a manual transmission 1 with gear ratios GR. A clutch 3 is positioned between the drive engine 2 and the transmission 1. The drive torque TQ available at the wheels 4 is produced from the (current) clutch torque $TQ_{CUR}$ available at the clutch 3 by deducting the torque loss caused by the clutch 3 and transmission 1. The clutch torque $TQ_{CUR}$ is itself produced in a known way by deducting the torque loss due to pumping, friction and accessories from the engine torque produced by the engine 2. A current power output $P=TQ_{CUR}*2\pi*N$ is therefore available at clutch 3 or transmission 1.

Figure 2:
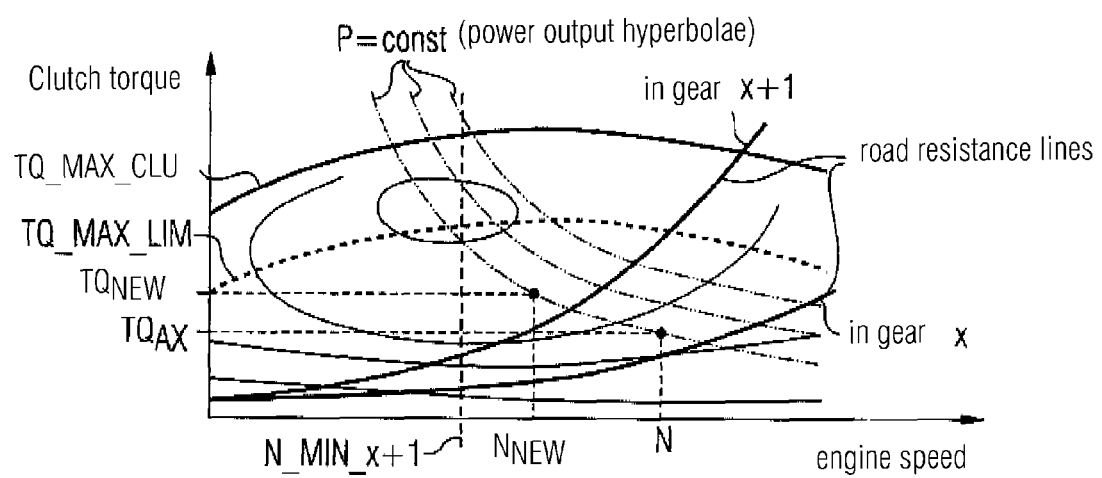
FIG. 2 shows a mapping diagram, in which clutch torque is plotted against engine speed.

As is known, the operating point of a combustion engine is defined by its torque (load) and its engine speed. FIG. 2 gives a two-dimensional representation of the so-called engine characteristic graph, i.e. the totality of all possible operating points, wherein it is not the engine torque itself, but the clutch torque, as values derived from it, which is selected as the load. It also shows three lines of constant engine power output, the power output hyperbolae. There are also two road resistance lines, one of which refers to a gear x and the other to a gear x+1.

When using the method, it is assumed that the vehicle speed following a gear shift remains at least approximately the same as before. The current operating point $(TQ_{CUR};N)$, (see FIG. 2), can, on this assumption, only move along the appropriate power output hyperbola as a result of the gear shift, and only as far as the new engine operating point $(TQ_{NEW}; N_{NEW})$, which can be seen in the upshift depicted by way of example in FIG. 2. A control circuit contained, for example, in the engine control device regularly, e.g. at a cadence of 100 ms, calculates, using the current engine operating point, a function, by means of which it is determined whether the optimum (up)shift point has already been reached. If this is the case, a shift recommendation is made available, for example on a vehicle CAN bus, so that the shift recommendation is made available for display on the instrument panel.

The control device calculates first of all, from the current engine operating point $(TQ_{CUR};N)$ and the known ratios of the transmission 1 and using the formulae $TQ_{NEW} TQ_{CUR} *GR/GR_{NEW}$ $N_{NEW}=N*GR_{NEW}/GR$ the new operating point $(TQ_{NEW}; N_{NEW})$, which will exist following a shift, whereby GR refers to the current gear step and $GR_{NEW}$ refers to the ratio of the target gear step. Next, the new operating point, which could be achieved by means of the shift, is again evaluated by the control circuit as to whether it lies within a segment of the engine characteristic graph regarded as favorable, also with respect to ride comfort, and thus in an optimized operating range. For this purpose, for an upshift, an upper torque limit TQ_MAX_LIM is stored in the control device, which runs in the engine characteristic graph (see FIG. 2) at approximately a constant distance below the line TQ_MAX_CLU, representing the maximum available clutch torque in the engine in question. A lower, i.e. minimum engine speed limit N_MIN_x+1 (see FIG. 2) is also stored, which gives the minimum drivable engine speed for the target gear step x+1. The control device now checks whether the calculated new operating point $(TQ_{NEW}; N_{NEW})$ is, along with its clutch torque $TQ_{NEW}$, below the upper torque limit TQ_MAX_LIM, so that a comfortable reserve of torque is available in the target gear and, with engine speed $N_{NEW}$ above the lower engine speed limit N_MIN_x+1. If this is the case, the required conditions for an upshift are met and the current operating point still in existence for the time being $(TQ_{CUR};N)$ is determined as the optimized upshift point.

Successful determination of the optimized upshift point makes it possible to display an upshift recommendation on the instrument panel. Further conditions can easily be implemented in the control device, to which the display of an upshift recommendation is to be linked when the conditions for an optimized shift point are present at least singly or briefly. It is favorable to provide for several activation conditions and a time manager for the shift recommendation. Using presettable threshold values, the activation conditions ensure that the driving style and the current engine operation are suitable for an upshift recommendation. The time manager ensures that the upshift recommendation, in addition to the condition relating to the position of the new engine operating point, is switched on and off with a time-based strategy. It is anticipated that the shift recommendation will remain switched on between an adjustable minimum and maximum time. When the maximum time is reached, it is assumed that the driver has not heeded the recommendation and the function of the control device is switched off until engine operation reappears in partial load. It is also anticipated that the first switching on will only occur after the expiry of a delay period after each new engine start.

What is claimed is:

1. A method for determining an optimized upshift point for a vehicle with a combustion engine and a manual transmission, comprising the step of:
    determining a current engine operating point defined by a current clutch torque and a current engine speed,
    using a control circuit to calculate a new engine operating point corresponding to a new transmission gear based on the current engine operating point and preset gear ratios in the transmission, including calculating a new clutch torque and a new engine speed that define the new engine operating point,
    evaluating the validity of the new engine operating point by:
        comparing the calculated new clutch torque to a preset upper torque limit, the stored upper torque limit comprising a predefined curve in engine characteristic graph that is offset from a curve representing a maximum available clutch torque in the engine,
        comparing the calculated new engine speed to a stored minimum engine speed corresponding to the new transmission gear,
        determining the new engine operating point as valid if (a) the calculated new clutch torque is below the stored upper torque limit and (b) the calculated new engine speed is above the stored minimum engine speed, and
        determining the current engine operating point as an optimized upshift point if the new engine operating point is determined as valid.

2. The method according to claim 1, wherein the preset upper torque limit in the engine characteristic graph runs at a presettable, essentially constant distance below the curve representing the maximum available clutch torque.

3. The method according to claim 1, wherein the control circuit regularly calculates whether new calculated engine operating points are valid as the optimized shift point to be determined.

4. The method according to claim 3, wherein the control circuit calculates whether new calculated engine operating points are valid at an interval of about 100 ms.

5. The method according to claim 1, wherein the control circuit issues a shift recommendation in the form of an optical signal by means of a display connected to one of its outputs, if the current engine operating point is determined by the control circuit as an optimized shift point.

6. The method according to claim 5, wherein the control circuit only issues the shift recommendation if at least one additional activation condition is met, containing a limit value relating to the driving style and/or the current engine operation.

7. The method according to claim 5, wherein a switching on and/or switching off of the shift recommendation is linked to an additional condition, containing a time criterion.

8. The method according to claim 7, wherein, after each new engine start, an initial shift recommendation is only allowed to be switched on after an adjustable delay period.

9. A method for determining an optimized downshift point for a combustion engined vehicle with manual transmission, comprising the step of
    determining a current engine operating point defined by a current clutch torque and a current engine speed,
    using a control circuit to calculate a new engine operating point corresponding to a new transmission gear based on the current engine operating point and preset gear ratios in the transmission, including calculating a new clutch torque and a new engine speed that define the new engine operating point,
    evaluating the validity of the new engine operating point by:
        comparing the calculated new clutch torque to a preset lower torque limit, the stored upper torque limit,
        comparing the calculated new engine speed to a stored maximum engine speed corresponding to the new transmission gear,
        determining the new engine operating point as valid if (a) the calculated new clutch torque is above the stored lower torque limit and (b) the calculated new engine speed is below the stored maximum engine speed, and
        determining the current engine operating point as an optimized downshift point if the new engine operating point is determined as valid.

10. The method according to claim 9, wherein the preset lower torque limit in the engine characteristic graph runs at a presettable, essentially constant distance above the curve representing the minimum available clutch torque.

11. The method according to claim 9, wherein the control circuit regularly calculates whether new calculated engine operating points are valid as the optimized shift point to be determined.

12. The method according to claim 11, wherein the control circuit calculates whether new calculated engine operating points are valid at an interval of about 100 ms.

13. The method according to claim 9, wherein the control circuit issues a shift recommendation in the form of an optical signal by means of a display connected to one of its outputs, if the current engine operating point is determined by the control circuit as an optimized shift point.

14. The method according to claim 13, wherein the control circuit only issues the shift recommendation if at least one additional activation condition is met, containing a limit value relating to the driving style and/or the current engine operation.

15. The method according to claim 13, wherein a switching on and/or switching off of the shift recommendation is linked to an additional condition, containing a time criterion.

16. The method according to claim 15, wherein, after each new engine start, an initial shift recommendation is only allowed to be switched on after an adjustable delay period.

* * * * *